US010922238B2

(12) United States Patent
Ottogalli et al.

(10) Patent No.: US 10,922,238 B2
(45) Date of Patent: Feb. 16, 2021

(54) METHOD FOR STORING CONTENT, METHOD FOR CONSULTING CONTENT, METHOD FOR MANAGING CONTENT AND CONTENT READERS

(71) Applicant: Orange, Paris (FR)

(72) Inventors: Francois-Gael Ottogalli, Challes les Eaux (FR); Philippe Raipin Parvedy, Saint Ouen des Alleux (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/075,873

(22) PCT Filed: Feb. 3, 2017

(86) PCT No.: PCT/FR2017/050247
§ 371 (c)(1),
(2) Date: Aug. 6, 2018

(87) PCT Pub. No.: WO2017/134399
PCT Pub. Date: Aug. 10, 2017

(65) Prior Publication Data
US 2019/0057039 A1 Feb. 21, 2019

(30) Foreign Application Priority Data
Feb. 4, 2016 (FR) ...................................... 1650891

(51) Int. Cl.
*G06F 12/10* (2016.01)
*G06F 21/62* (2013.01)
(Continued)

(52) U.S. Cl.
CPC ............ *G06F 12/10* (2013.01); *G06F 3/0604* (2013.01); *G06F 3/0659* (2013.01);
(Continued)

(58) Field of Classification Search
None
See application file for complete search history.

(56) References Cited

U.S. PATENT DOCUMENTS

2003/0182626 A1* 9/2003 Davidov ................... G06F 8/30
715/234
2006/0080351 A1* 4/2006 Powell ..................... G06F 21/10
(Continued)

OTHER PUBLICATIONS

"The Cryptolope Liveü Product." IBM Cryptolope Live. General Information Guide, XX, XX, pp. 1-36. Jan. 1, 1997.
(Continued)

*Primary Examiner* — William E. Baughman
(74) *Attorney, Agent, or Firm* — Dvaid D. Brush; Westman, Champlin & Koehler, P.A.

(57) ABSTRACT

A method for storing content implemented by a first content reader. The first content reader includes a processor, a first memory for storing content, a virtualisation layer and a material abstraction layer. The method includes, during storage of first content in a given format, generating first standalone content, following which the first standalone content is stored in the first memory. Generating the first standalone content includes creating first container in which are stored at least the first content to be stored in the given format, and a first access processing step adapted to the given format and associated with the first content to be stored, the data stored in the first container making up the first standalone content. Thus, access to the stored content is guaranteed while the content reader is capable of implementing the access processing step stored with the content in the standalone content.

14 Claims, 4 Drawing Sheets

(51) Int. Cl.
G06F 16/78 (2019.01)
G06F 16/40 (2019.01)
G06F 3/06 (2006.01)

(52) U.S. Cl.
CPC ............ G06F 3/0673 (2013.01); G06F 16/40 (2019.01); G06F 16/7867 (2019.01); G06F 21/6209 (2013.01); *G06F 2212/1008* (2013.01); *G06F 2212/657* (2013.01)

(56) References Cited

U.S. PATENT DOCUMENTS

| | | | |
|---|---|---|---|
| 2008/0134012 A1* | 6/2008 | Kokes | H04L 65/604 |
| | | | 715/201 |
| 2012/0117016 A1* | 5/2012 | Freese | G06N 5/02 |
| | | | 706/50 |
| 2015/0113400 A1 | 4/2015 | Andrianakou et al. | |
| 2015/0205628 A1 | 7/2015 | Millar | |

OTHER PUBLICATIONS

International Search Report dated Mar. 15, 2017 for corresponding International Application No. PCT/FR2017/050247, filed Feb. 3, 2017.

English translation of the Written Opinion of the International Searching Authority dated Mar. 15, 2017 for corresponding International Application No. PCT/FR2017/050247, filed Feb. 3, 2017.

* cited by examiner

METHOD FOR STORING CONTENT, METHOD FOR CONSULTING CONTENT, METHOD FOR MANAGING CONTENT AND CONTENT READERS

CROSS-REFERENCE TO RELATED APPLICATIONS

This Application is a Section 371 National Stage Application of International Application No. PCT/FR2017/050247, filed Feb. 3, 2017, the content of which is incorporated herein by reference in its entirety, and published as WO 2017/134399 A1 on Aug. 10, 2017, not in English.

FIELD OF THE DISCLOSURE

The invention relates to a content storage method and a content reader.

BACKGROUND OF THE DISCLOSURE

Currently, when a content is stored, it is written into an internal or external memory of a content reader. The content reader comprises either an access circuit suited to the format of the stored content or a processor implementing a consultation method suited to the format of the content. Thus, the content reader can read only the content stored in this memory whose format corresponds to the format of the circuit/consultation method.

The problem is that, with the formats evolving over time, upon a subsequent read of a stored content, the circuit/method for consulting a given format may no longer be available. The content reader will then no longer be able to read the content of this given format. Thus, the life cycle of the stored content corresponds to the life cycle of the version of the format in which it was stored.

To avoid this problem, the designers of circuit/method for consulting a given content format making their circuit/method evolve, generally provide for the consultation circuit/method corresponding to a new version of the given format to include the consultation circuit/method corresponding to the earlier version of the given format. Thus, a circuit/method for consulting a given format will be able to read not only the content stored in a current version of the given format but also in the earlier version(s) of this given format.

The drawback with this solution is that the owner of the stored content depends on the goodwill of the consultation circuit/method designer and on the technical compatibility between the circuit/method for consulting the new version and the circuit/method for consulting the preceding version.

Another solution proposed directly by the storage systems such as the electronic document management systems, is, upon the updating of the formats, the conversion of the stored content into an updated format. That requires the format updates to be monitored, and each stored content to be converted into this format on each of the updates. This solution is therefore very cumbersome to implement both in terms of computation cost, but also in terms of memory because, for the time of the conversion, each content exists in the preceding format and the updated format.

Thus, the proposed solutions concern only the content stored in a format for which a consultation circuit/method remains available in a version subsequent to the version used upon the storage of the content.

Indeed, when a format disappears, this solution is not guaranteed access to the content stored in the disappeared format. Thus, the life cycle of the stored content corresponds to the life cycle of the format (whatever its version) in which it was stored.

And, when a first user stores a content in a given version of a given format on a memory that he or she shares (by giving him or her the access rights, by giving him or her the information medium comprising the memory, etc.) with a second user, the second user will be able to read this content only with a content reader comprising an access device or implementing a method for consulting the given format in this version or a subsequent version. Thus, a second user using a content reader connected to this memory and comprising an access device or implementing a method for consulting the given format in an earlier version, will not have access to this content.

SUMMARY

One of the aims of the present invention is to remedy the inadequacies of the prior art.

A subject of the invention is a method for storing content implemented by a first content reader, the first content reader comprising a processor, a first content storage memory, a virtualization layer and a hardware abstraction layer, the storage method comprising, upon the storage of a first content of a given format, a generation of a first autonomous content following which the first autonomous content will be stored in the first memory, the generation of the first autonomous content comprises a creation of a first container in which are stored at least the first content to be stored in the given format, and a first access processing suited to the given format and associated with the first content to be stored, the data stored in the first container constituting the first autonomous content.

Thus, the access to the stored content is guaranteed as long as the content reader is able to implement the access processing stored with the content in the autonomous content. Therefore, not only is the life cycle of the content thus prolonged but also the accessibility by authorized third parties is facilitated since they do not have to search for a specific access device to consult a content that they did not store by means of one of their storage devices but for which they have obtained the access rights.

Advantageously, the storage method comprises a write, in the first memory, of the first autonomous content.

Thus, the exchanges are reduced since the storage method directly comprises the write into the memory instead of controlling a device for writing in a memory.

Advantageously, the storage method comprises, upon the generation of a first autonomous content, a generation of execution processing suited to the execution of a first access processing of the first autonomous content on the hardware abstraction layer, the execution processing generated being stored in the virtualization layer in association with the first autonomous content.

Since the execution processing is associated with the autonomous content of a content, the execution of the access processing on the content reader offers a greater guarantee of success thus commensurately prolonging the life span of the content stored in this autonomous content.

Advantageously, the storage method comprises, upon a generation of a second autonomous content, a search for an execution processing suited to the execution of a first access processing of the second autonomous content on the hardware abstraction layer of the first reader.

Thus, either the execution processing is not already stored, and in this case, it can be saved allowing a better guarantee of access to the content of the second autonomous content by execution of the access to the content directly on the hardware abstraction layer; or, the execution processing is already stored, and in this case, the use of the virtualization layer can be optimized since the execution processing can be registered only once regardless of the number of autonomous contents of the first memory for which this execution processing will be used.

Advantageously, the storage method comprises, if necessary, an association with the second autonomous content of the execution processing resulting from the search and already stored in the virtualization layer.

Thus, the use of the virtualization layer is optimized since the execution processing can be registered only once regardless of the number of autonomous contents of the first memory for which this execution processing will be used.

Advantageously, upon a copy, on the first content storage memory of the first content reader, of a content of an autonomous content stored in a second content storage memory of a second content reader, the storage method comprises:

a storage of the autonomous content of the content to be copied in the first memory, and a modification of the virtualization layer of the first content reader associating an execution processing suited to the execution of the access processing of the autonomous content of the content copied on the hardware abstraction layer of the first reader.

Thus, the storage method guarantees in particular the portability of the content on a memory other than that on which it was stored originally and makes it possible to guarantee the accessibility to the stored content despite the potential issues of reliability of the electronic storage media constituting the memory, in particular linked to their life span.

Advantageously, the storage method comprises, upon a modification, on the first content reader, of an access processing, an update, as a function of the modified access processing, of at least one access processing associated with a content in a container of an autonomous content stored on the first memory.

A subject of the invention is also a method for consulting contents implemented by a content reader, the content reader comprising a processor, a content storage memory, a virtualization layer and a hardware abstraction layer, the consultation method comprises, upon a reception of a request to access a content of a given format stored in the first memory of the first content reader, an execution of a first access processing suited to the given format associated with the stored content, the access processing and the content being stored in a first container of the memory and constituting an autonomous content.

Thus, the exchanges are reduced since the storage method directly comprises the access to the content in the memory instead of controlling an access device in a memory.

Advantageously, the execution of the access processing is implemented by an execution processing associated with the autonomous content on the hardware abstraction layer of the content reader implemented by the processor of the content reader.

Advantageously, according to an implementation of the invention, a content management method comprises a storage method according to the invention and a consultation method according to the invention.

Advantageously, according to an implementation of the invention, the various steps of the method according to the invention are implemented by software or a computer program, this software comprising software instructions intended to be executed by a data processor of a content reader and being designed to control the execution of the various steps of this method.

The invention therefore also targets a program comprising program code instructions for executing steps of the storage method and/or of the consultation method and/or of the management method when the program is run by a processor.

This program can use any programming language and be in the form of source code, object code or intermediate code between source code and object code, such as in a partially-compiled form or in any other desirable form.

A subject of the invention is also a content reader comprising a first content storage memory, a virtualization layer, a hardware abstraction layer, and a processor implementing the storage method according to the invention.

A subject of the invention is also a content reader comprising a first content storage memory, a virtualization layer, a hardware abstraction layer, and a processor implementing the consultation method according to the invention.

A subject of the invention is also a content reader comprising a first content storage memory, a virtualization layer, a hardware abstraction layer, and a processor implementing the management method according to the invention.

Advantageously, the first content storage memory is a memory external to the content reader connected to said content reader upon the implementation of the storage method.

BRIEF DESCRIPTION OF THE DRAWINGS

The features and advantages of the invention will become more clearly apparent on reading the description, given by way of example, and the figures relating thereto which represent.

DETAILED DESCRIPTION OF ILLUSTRATIVE EMBODIMENTS

The aim of an exemplary embodiment of the invention is to guarantee that the stored contents remain accessible over time, that is to say in 10, 20, 30 years or more. Accessible is understood to mean consultable for the simple reader, but also modifiable for modifications as corrections, comments, and other such types.

Figure 1A:
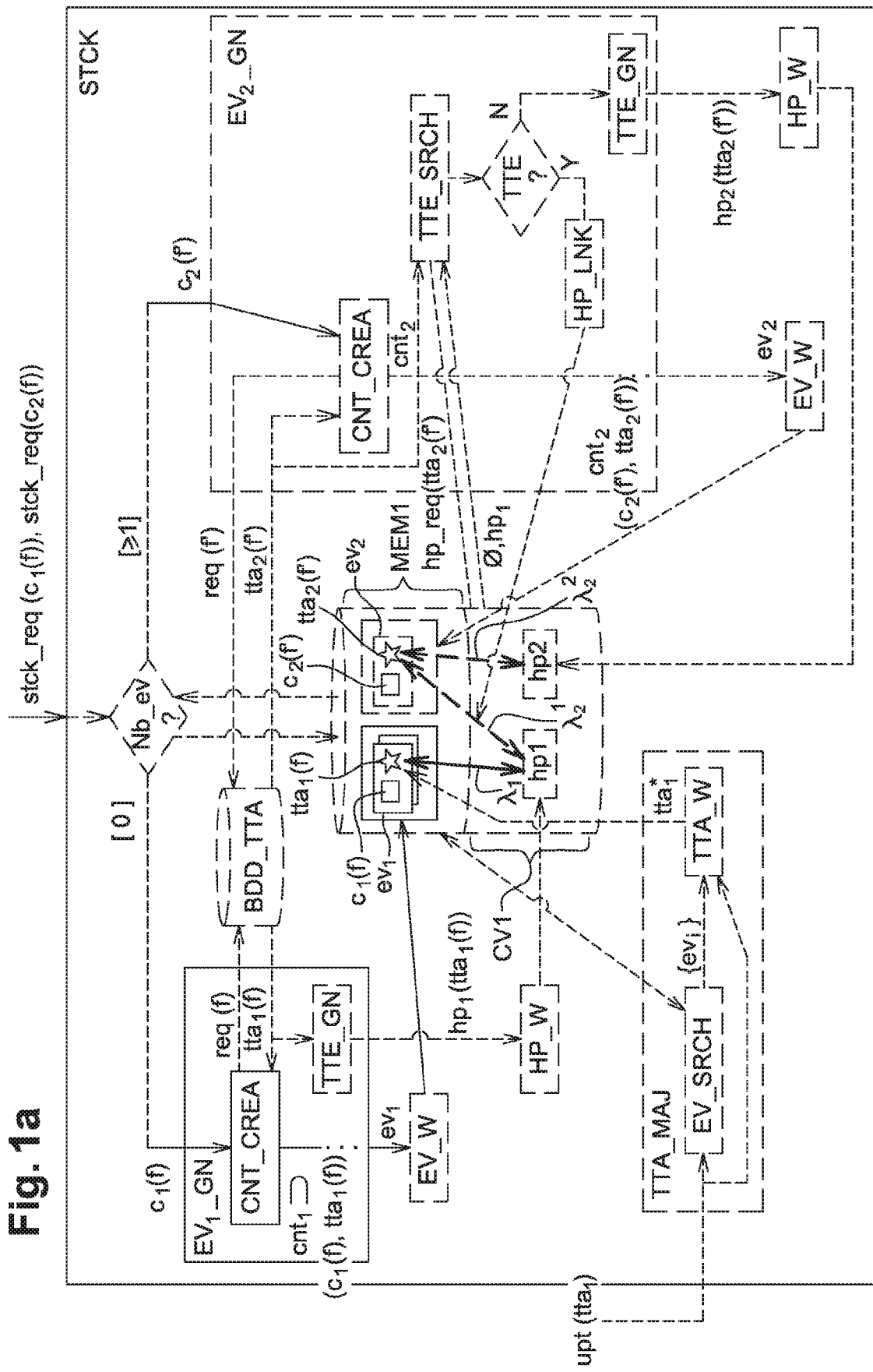
FIGS. 1a and 1b, simplified diagrams of a storage method according to the invention, respectively of a part of the storage method comprising in particular the generation of autonomous contents, and of another part of the storage method comprising a transfer of a content from a first memory to a second memory.

FIG. 1a illustrates a simplified diagram of a storage method according to the invention, in particular of a part of the storage method comprising in particular the generation of autonomous contents.

The content storage method is implemented by a first content reader, the first content reader comprising a processor, a first content storage memory MEM1, a virtualization layer CV1 and a hardware abstraction layer.

The storage method comprises, upon the storage STCK of a first content of a given format c1(f), a generation of a first autonomous content EV1_GN following which the first autonomous content ev1 will be stored in the first memory MEM1. The generation of the first autonomous content EV1_GN comprises a creation CNT_CREA of a first container cnt1 in which are stored data comprising at least:
- the first content to be stored in the given format c1(f), and
- a first access processing tta1(f) suited to the given format and associated with the first content to be stored.

The data stored in the first container cnt1 constitute the first autonomous content ev1.

The first autonomous content ev1 is called autonomous because it allows a content reader to access the first content c1(f) that it comprises even if the content reader does not have a first access processing suited to the format f of the first content f. Indeed, the content reader reading the first autonomous content will execute the access processing tta1(f) registered in the first autonomous content ev1 to access this first content c1(f). For that reason, an autonomous content can also be called "virtual execution environment" since it allows the execution of this access processing even if it is not available in the content reader.

Since the autonomous content comprises the access processing of its content, the access to the stored content is then guaranteed regardless of the content reader, as long as the latter is able to implement the access processing stored in association with the content in the autonomous content.

Several first contents c1 can thus be stored in the form of several first autonomous contents ev1 in different first containers cnt1 in the first memory MEM1.

In particular, a request for storage of a content stck_req (c1(f)), stck_req(c2(f')) in the first memory of the first content reader is received. Notably, the storage method STCK comprises a reception of this request for storage of a content STCK_RC (not illustrated). Possibly, the request for storage of a content stck_req(c1(f)), stck_req(c2(f')) triggers the storage method STCK.

In particular, upon the creation of the first container cnt1, the access processing tta1(f) suited to the format of the first content c1(f) is either sought TTTA_SRCH (not illustrated) in an access processing database BDD_TTA, or supplied with the content c1(f) by a content creation method C_CREA (not illustrated) supplying the first content c1(f). In the case of the search in a database, the content creation CNT_CREA notably sends an access processing request as a function of the format of the first content req(f) to at least one access processing base BDD_TTA which, in response, supplies it with the ad hoc access processing, in this particular case a first access processing tta1(f).

In particular, the storage method STCK comprises a write EV_W, in the first memory MEM1, of the first autonomous content ev1.

In particular, the storage method STCK comprises, upon the generation of a first autonomous content EV1_GN, a generation of execution processing TTE_GN supplying a first execution processing suited to an execution of a first access processing of the first autonomous content tta1(f) on the hardware abstraction layer. The execution processing generated i.e. the first execution processing hp1(tta1(f)) in the case of the first access processing, is stored HP_W in the virtualization layer CV1 in association with the first autonomous content ev1.

The execution processing allows a content reader to directly execute the access processing of an autonomous content on its hardware abstraction layer upon access to the content of the autonomous content. For this reason, the execution processing can also be called "hypervisor".

Thus, the guarantee of access to the content regardless of the content reader is enhanced by virtue of the execution processing since it executes the access processing of the autonomous content directly on the hardware abstraction layer.

In FIG. 1a, the association between the first autonomous content ev1 and the first execution processing hp1 is illustrated by a link λ1. This link λ1 is notably stored on the first memory in the first container cnt1. The first autonomous content ev1 is thus formed not only by the first content c1, the first access processing tta1 but also by the link to the first execution processing hp1.

Thus, when an access to the first content c1 is requested, this request triggers the execution, by the first execution processing hp1 by virtue of the link λ1 of the first autonomous content ev1 comprising the first content c1 to this first execution processing hp1, of the first access processing tta1 of this first autonomous content ev1 to access the first content c1, notably to consult and/or modify and/or print, etc., the first content.

In particular, the storage method STCK determines Nb_ev? if at least one autonomous content ev is already stored in the first memory notably following a request for storage of a content c. Thus, if no autonomous content is stored [0], the storage method proceeds to generate a first autonomous content EV1_GN, otherwise [≥1], the storage method STCK proceeds to generate a second autonomous content EV2_GN.

The generation of a second autonomous content EV2_GN can be at least partly identical to the generation of a first autonomous content EV1_GN, that is to say also comprise a creation of a container CNT_CREA, in this case of a second container cnt2. This second container cnt2 stores data comprising at least:
- the second content to be stored c2(f') in a given format f', possibly different from the format f of the first content c1, and
- a second access processing tta2(f') suited to the given format f' and associated with the second content to be stored c2.

The data stored in the second container cnt2 constitute the second autonomous content ev2.

Several second contents c2 can thus be stored in the form of several second autonomous contents ev2 in different second containers cnt2 in the first memory MEM1.

In particular, upon the creation of the second container cnt2, the access processing tta2(f') suited to the format of the second content c2(f') is either sought TTTA_SRCH (not illustrated) in an access processing database BDD_TTA, or supplied with the content c2(f') by a content creation method C_CREA (not illustrated) supplying the second content c2(f'). In the case of the search in a database, the content creation CNT_CREA notably sends a access processing request as a function of the format of the second content req(f') to at least one access processing base BDD_TTA which, in response, supplies it with the ad hoc access processing, in this case a second access processing tta2(f').

In particular, the storage method STCK comprises, upon a generation of a second autonomous content EV2_GN, a search TTE_SRCH for an execution processing supplying a first execution processing suited to an execution of a first access processing of the second autonomous content ev2 on the hardware abstraction layer of the first reader.

For example, the search TTE_SRCH notably sends an execution processing request as a function of the access processing of the second autonomous content hp_req(tta2 (f)) to the first virtualization layer CV1 which, in response, supplies it with information concerning the ad hoc execution processing if it is stored therein (for example, an identifier of and/or an address to and/or a link to the ad hoc execution processing stored), in our example, the first execution processing hp1, otherwise information Ø on absence of ad hoc execution processing in the virtualization layer.

Notably, the storage method STCK can determine TTE? whether the content reader already has an execution processing allowing the execution of the access processing of the second autonomous content on its hardware abstraction layer, for example as a function of the results of the search TTE_SRCH. This determination TTE? allows the storage method STCK to optimize both the guarantee of access to the stored content and the resources of the content reader. Indeed, the storage method STCK can thus decide, as a function of the existence Y or non-existence N of an ad hoc execution processing for the second autonomous content, respectively on an association with the second autonomous content of the existing execution processing HP_LNK (for example supplied by the search TTE_SRCH, notably in the form of an identifier and/or of an address and/or of a link, etc.) or on the generation of a second suitable execution processing TTE_GN.

In particular, the storage method STCK comprises, if necessary, an association HP_LNK with the second autonomous content ev2 of the execution processing hp1 resulting from the search and already stored in the virtualization layer.

The association between the second autonomous content ev2 and the first execution processing hp1 is illustrated, by way of example, by a link $\lambda_2^1$. This link $\lambda_2^1$ is notably stored on the first memory in the second container cnt2. The second autonomous content ev2 is then composed not only of the second content c2, of the second access processing tta2, but also of the link $\lambda_2^1$ to the first execution processing hp1.

In the case of a determination of the non-existence N of an ad hoc execution processing for the second autonomous content ev2, the storage method comprises a generation of execution processing TTE_GN supplying a second execution processing suited to an execution of the second access processing of the second autonomous content tta2(f) on the hardware abstraction layer. The execution processing generated, i.e. the second execution processing hp2(tta2(f)) in the case of the second access processing, is stored HP_W in the virtualization layer CV1 in association with the second autonomous content ev2.

The association between the second autonomous content ev2 and the second execution processing hp2 is illustrated by a link $\lambda_2^2$. This link $\lambda_2^2$ is notably stored on the first memory in the second container cnt2. The second autonomous content ev2 is then composed not only of the second content c2, of the second access processing tta2, but also of the link to the second execution processing hp2.

In particular, the storage method STCK comprises, upon a modification, on the first content reader, of an access processing upt(tta1), an update TTA_MAJ, as a function of the modified access processing, of at least one access processing tta1, tta2 associated with a content c1, c2 of an autonomous content ev1, ev2 stored on the first memory MEM1.

The access processing update TTA_MAJ comprises, in particular, a search EV_SRCH in the first memory MEM1 for the autonomous contents having an associated access processing corresponding to the modified access processing, for example the first access processing tta1. This search EV_SRCH for autonomous contents to be updated is notably triggered by a modification command, on the first content reader, for an access processing upt(tta1). The search for the autonomous contents to be updated EV_SRCH supplies, for example, a list of the autonomous contents concerned {ev$_i$}, for example in the form of a list of memory addresses, of links to these autonomous contents, etc.

In particular, if the access processing update TTA_MAJ comprises a write either of the modified access processing or of the modification of the access processing TTA_W in the autonomous contents ev1, ev2 comprising an access processing affected by the modification (notably indicated by the search for autonomous contents to be updated EV_SRCH). In the example of FIG. 1a, the modified access processing being the first access processing tta1, the write records either the modification tta1* with the first access processing tta1, or the processing tta1* modified in the first container cnt1 of the first autonomous content ev1.

The fact that the update of the access processing can be executed on the execution processing is important and is not trivial.

In the case where the modified access processing tta1* requires, to access the content c1 a use of a graphics processor (GPU) of the reader,
either the original access processing tta1 is executed on an execution processing not offering a use of a graphics processor (GPU) of the computer, the execution processing hp will then also have to be modified for the modified processing tta1*l being executed on the modified execution processing hp* (not illustrated) to be executed on the graphics processor;
or the execution processing hp emulates the graphics processor and, in this case, the modification of the access processing has no impact on the execution processing.

The execution environment, that is to say the execution processing, is not, generally, therefore impacted by the modification of the access processings of the host reader, there is therefore no impact on the property of durability of the content.

Figure 1B:
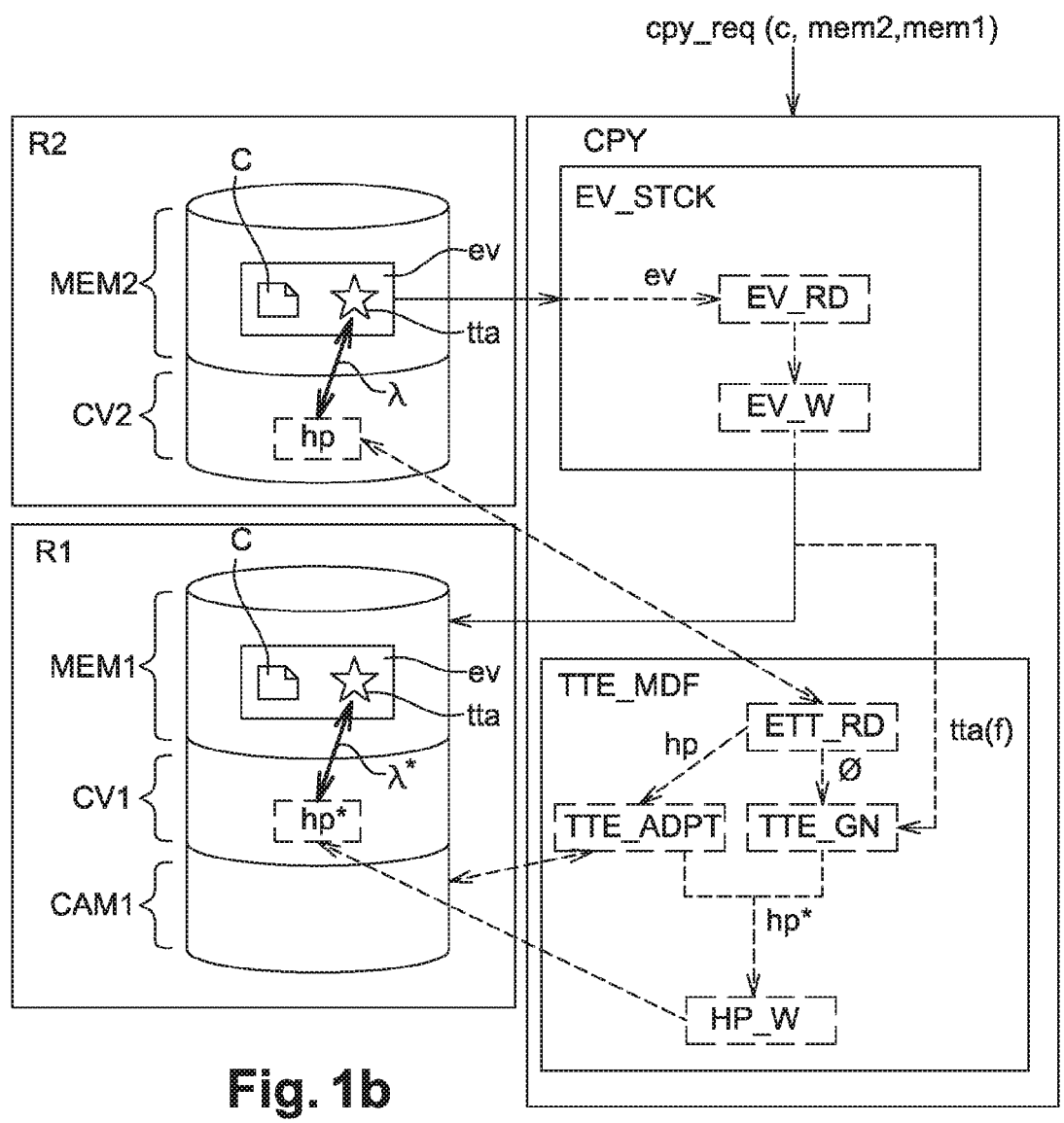

FIG. 1b illustrates a simplified diagram of a storage method according to the invention, in particular of another part of the storage method comprising a transfer of a content from a first memory to a second memory.

In particular, upon a copy CPY, on the first content storage memory MEM1 of the first content reader R1, of a content c of an autonomous content ev stored in a second content storage memory MEM2 of a second content reader R2, the storage method comprises:
a storage EV_STCK of the autonomous content of the content to be copied ev in the first memory MEM1, and
a modification TTE_MDF of the virtualization layer CV1 of the first content reader R1 associating λ* to an execution processing hp* suited to the execution, on the hardware abstraction layer CAM1 of the first reader R1, of the access processing tta of the autonomous content ev of the copied content c.

In particular, the copy CPY of the content c of the second memory MEM2 on the first memory MEM1 can be triggered by a copy request cpy_req(c,mem2,mem1). Notably, the copy CPY comprises reception of copy request CPY_RC (not illustrated) which orders the storage EV_STCK of the autonomous content ev comprising the content c to be copied in the first memory MEM1.

In particular, the storage EV_STCK of the autonomous content ev comprising the content c to be copied in the first memory MEM1 comprises a read EV_RD of the autonomous content ev comprising the content c to be copied in the second memory MEM2. Then, the storage EV_STCK of the autonomous content ev comprises a write EV_W of the autonomous content ev comprising the content c to be copied in the first memory MEM1.

In particular, the modification of the virtualization layer TTE_MDF comprises a generation of execution processing TTE_GN supplying an execution processing hp* suited to an execution of the access processing tta of the autonomous content ev on the hardware abstraction layer CAM1 of the first reader R1. The execution processing generated hp* is stored HP_W in the virtualization layer CV1 of the first reader R1 in association I* with the autonomous content ev.

In particular, the modification of the virtualization layer TTE_MDF comprises an execution processing read TTE_RD supplying an execution processing hp read on the virtualization layer CV2 of the second reader R2. The execution processing read hp is suited to an execution of the access processing tta of the autonomous content ev on the hardware abstraction layer CAM2 of the second reader R2. Then, the modification of the virtualization layer TTE_MDF comprises an adaptation of the execution processing TTE_ADPT which modifies the execution processing read hp as a function of the hardware abstraction layer CAM1 of the first reader R1 in which the suitable execution processing hp* will be registered HP_W.

In particular, the modification of the virtualization layer TTE_MDF comprises, following the read, on the virtualization layer CV2 of the second reader R2, of execution processing TTE_RD associated with the stored autonomous content ev, either the adaptation TTE_ADPT of the execution processing read hp or the generation of an execution processing TTE_GN. Notably, if the read TTE_RD supplies an execution processing hp, the latter is adapted TTE_ADPT, otherwise Ø (i.e. if no execution processing is available on the second reader R2 in association with the autonomous content ev to be copied) an execution processing is generated TTE_GN.

In particular, upon the transfer to a first memory of a content saved in a second memory, the autonomous content ev containing the content to be copied c is deleted from the second memory MEM2 after the copy CPY. If an execution processing hp is associated with the deleted autonomous content, the deletion of the autonomous content ev triggers the deletion at least of the association λ, even of the execution processing hp when the latter is not associated with other autonomous content of the second memory MEM2.

For example, the storage method of FIG. 1a can be complemented by the steps of FIG. 1b notably upon the transfer to a first memory of a content saved in a second memory.

Thus, only the execution processing is impacted by the transfer of the autonomous content from one memory to another. Techniques such as nested virtualization facilitate reporting of the execution processing, notably in hypervisor form, from one host reader to another.

Figure 2:
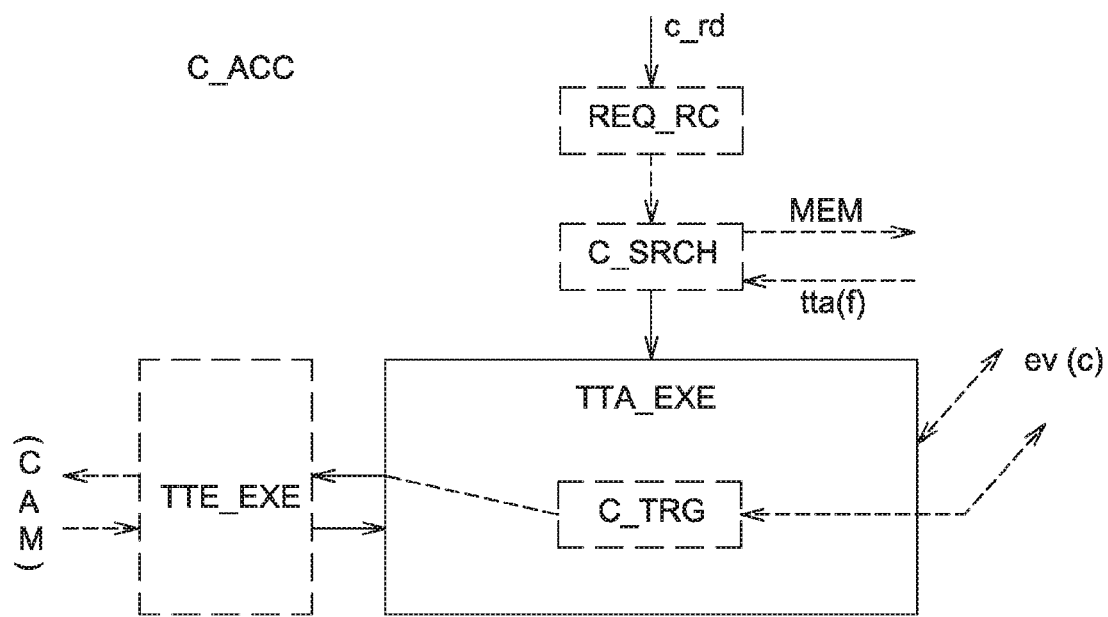
FIG. 2, a simplified diagram of a consultation method according to the invention.

FIG. 2 illustrates a simplified diagram of a consultation method according to the invention.

The content consultation method C_ACC is implemented by a content reader R1, R2, the content reader R1, R2 comprising a processor, a content storage memory MEM1, MEM2, a virtualization layer CV1, CV2 and a hardware abstraction layer CAM1, CAM2. The consultation method C_ACC comprises, upon a reception REQ_RC of an access request c_rd to a content of a given format stored in the memory MEM of the content reader, an execution TTA_EXE of an access processing tta(f) suited to the given format associated with the stored content c. The access processing tta(f) and the content c are stored in a container cnt of the memory MEM and constitutes an autonomous content ev.

In particular, the execution of the access processing TTA_EXE is implemented by an execution processing TTE_ EXE associated with the autonomous content on the hardware abstraction layer CAM of the content reader implemented by the processor of the content reader.

In particular, the execution of the access processing TTE_EXE comprises an access to the access processing tta(f) of the autonomous content ev of the content c consulted, which triggers TTE_TRG, the execution processing associated with the autonomous content ev. The implementation of the execution processing TTE_EXE comprises the execution of the steps of the access processing tta(f) TTA_EXE on the hardware abstraction layer CAM. The execution of the steps of the access processing tta(f) TTA_EXE comprises the access to the content c of the autonomous content ev.

In particular, the consultation method C_ACC comprises a search C_SRCH for the content c on the memory MEM which, in response, supplies the access processing tta(f) associated with the content c in the autonomous content ev triggering the execution of the access processing TTA_EXE.

Notably, a content management method comprises a storage method according to the invention and a consultation method according to the invention.

An embodiment of at least one of the methods according to the invention: storage method, consultation method, content management method, is a program comprising program code instructions for executing steps of the storage method or of the consultation method or of the content management method when the program is run by a processor.

Figure 3:
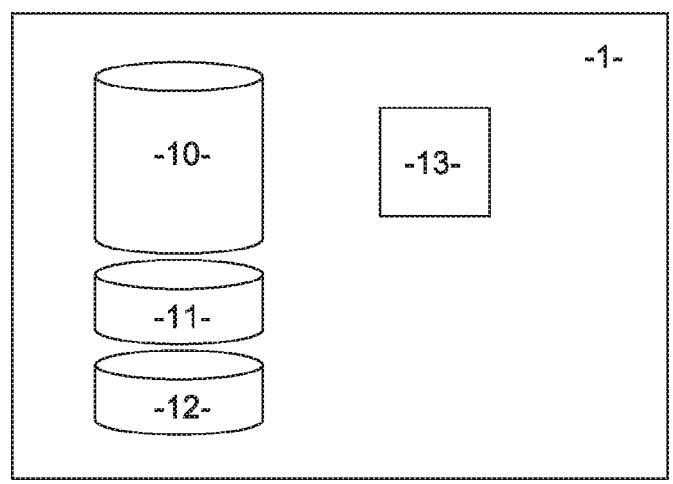
FIG. 3, a content reader implementing at least one of the storage or consultation methods according to the invention.

FIG. 3 illustrates a content reader implementing at least one of the storage or consultation methods according to the invention.

In a first embodiment, the content reader comprises a content storage memory, a virtualization layer, a hardware abstraction layer, and a processor implementing the storage method according to the invention.

In particular, the processor implements the consultation method according to the invention.

In a first embodiment, the content reader 1 comprises a content storage memory 10, a virtualization layer 11, a hardware abstraction layer 12, and a processor 13 implementing the content management method according to the invention.

In particular, the content storage memory 10 is a memory external to the content reader 1 connected to said content reader 1 upon the implementation of the storage method, regardless of the embodiment of the content reader 1.

In particular, a storage device 100 (not illustrated) comprises the content storage memory 10 and the virtualization layer 11. The storage device is, notably, external to the content reader 1: for example a USB key, a CD, an external disk, a storage space in a communication network (also called "cloud").... The external storage device is connected to said contact reader 1 upon the implementation of the storage method, regardless of the embodiment of the content reader 1.

Figure 4A:
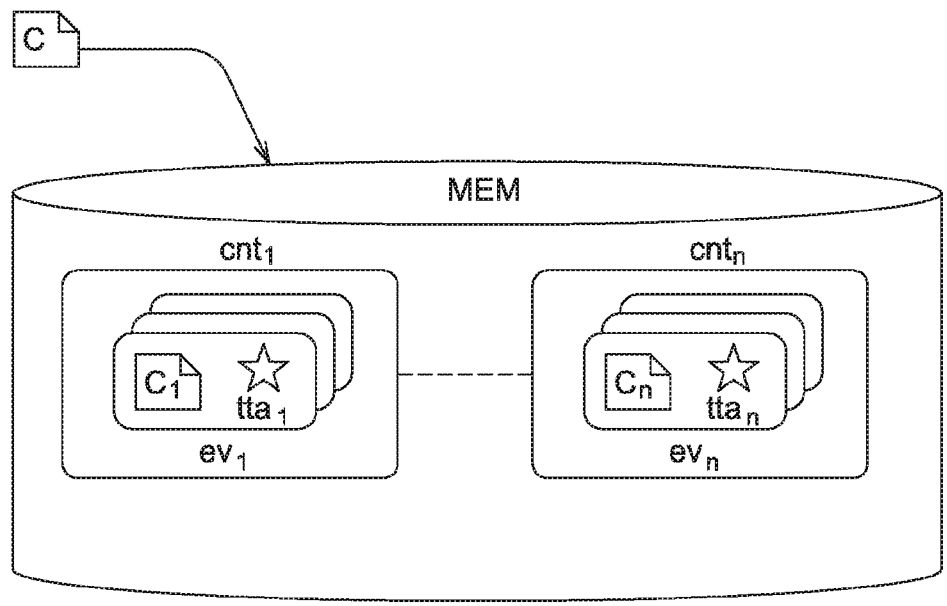
FIGS. 4a and 4b, diagrams of an architecture according to the invention, respectively of the functional architecture and of the link between the autonomous content and the content reader.

FIG. 4a illustrates a diagram of the functional architecture of the invention.

The contents c, useful data, are incorporated in a memory MEM of a content reader or of an external storage device.

Within this memory MEM, each content $c_1 \ldots c_n$ is registered in a container $cnt_1 \ldots cnt_n$. Each container $cnt_1 \ldots cnt_n$ is therefore responsible for the storage of a content but also the execution of the content manipulation functions associated with this content, that is to say the access processing $tta_1 \ldots tta_n$ associated respectively with each of these contents $c_1 \ldots c_n$. These data, namely the content $c_1 \ldots c_n$ and the associated access processing $tta_1 \ldots tta_n$, constitute an autonomous content ev: the container $cnt_1 \ldots cnt_n$ therefore supplies a virtualized execution environment serving as support for the execution of functions of the access processing $tta_1 \ldots tta_n$ upon access to the associated content $c_1 \ldots c_n$. The generation of autonomous contents $ev1 \ldots ev_n$ is the responsibility of the content reader comprising the memory MEM or connected thereto upon the storage of the content $c_1 \ldots c_n$.

Figure 4B:
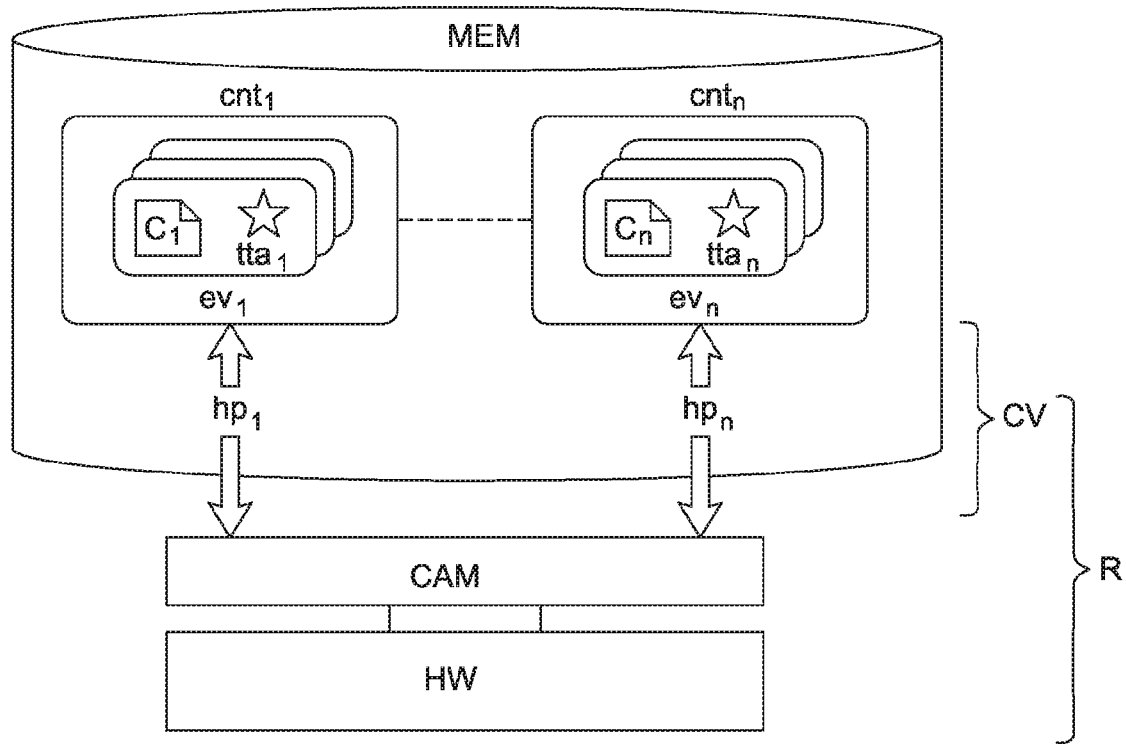

FIG. 4b illustrates a diagram of the architecture illustrating the link between the autonomous content and the content reader.

The autonomous content $ev1 \ldots ev_n$, in particular the access processing $tta_1 \ldots tta_n$ of the autonomous content $ev1 \ldots ev_n$, is executed on the resources made available by the content reader R that is the host of the storage device comprising the memory MEM upon the consultation of the content $c_1 \ldots c_n$ of the autonomous content $ev1 \ldots ev_n$.

The content reader R comprises a virtualization layer CV allowing the execution of the autonomous content $ev1 \ldots ev_n$ on the hardware abstraction layer CAM of the host reader R. The virtualization layer CV allows the implementation of the execution processing associated with the autonomous content $ev1 \ldots ev_n$ which executes the access processing $tta_1 \ldots tta_n$ of the autonomous content $ev1 \ldots ev_n$ on the hardware abstraction layer CAM. The hardware abstraction layer CAM being implemented by a processor of the hardware layer HW of the host reader R. The hardware layer HW notably comprises one or more of the following devices: a processor CPU, a read-only memory, a random-access memory, a storage space or memory MEM . . . .

In a particular embodiment of the invention, an autonomous content ev notably has the form of a virtual machine. In this particular embodiment, the execution processing compatible with the format of the virtual machine constituting the autonomous content is a hypervisor. In this case, guaranteeing the capacity of the reader R to execute the access processing associated with a content is equivalent to guaranteeing the execution of the autonomous content virtual machine on the host reader, that is to say the execution of the hypervisor associated with the autonomous content on the hardware abstraction layer.

Now, through its structure of exo even nano-kernel type, a hypervisor is a minimal processing whose durability is much easier to guarantee than those of the access processings associated with the contents.

The invention also targets a medium. The information medium can be any entity or device capable of storing the program. For example, the medium can comprise a storage means, such as ROM, for example a CD ROM or a microelectronic circuit ROM or even a magnetic storage means, for example a diskette or a hard disk.

Also, the information medium can be a transmissible medium such as an electrical or optical signal which can be routed via an electrical or optical cable, by radio or by other means. The program can in particular be downloaded over a network, notably of internet type.

Alternatively, the information medium can be an integrated circuit in which the program is incorporated, the circuit being adapted to execute or to be used in the execution of the method concerned.

In another implementation, the invention is implemented by means of software and/or hardware components. In this respect, the term module can correspond equally to a software component or to a hardware component. A software component corresponds to one or more computer programs, one or more subprograms of a program, or, more generally, to any element of a program or software capable of implementing a function or a set of functions according to the description above. A hardware component corresponds to any element of a hardware assembly capable of implementing a function or a set of functions.

Although the present disclosure has been described with reference to one or more examples, workers skilled in the art will recognize that changes may be made in form and detail without departing from the scope of the disclosure and/or the appended claims.

The invention claimed is:

1. A storage method comprising:
   storing content by a first content reader, the first content reader comprising a processor, a first content storage memory, a virtualization layer and a hardware abstraction layer, wherein the storing comprises:
   receiving a request for storing a first content of a given format;
   in response to the request, generating a first autonomous content, comprising creating a first container in which are stored at least the first content to be stored in the given format and a first access processing suited to the given format and associated with the first content to be stored, and wherein data stored in the first container constitutes the first autonomous content;
   generating a first execution processing, stored in the virtualization layer in association with the first autonomous content, the first execution processing being adapted to execute the first access processing of the first autonomous content using the hardware abstraction layer of the first content reader; and
   in response to a modification, on the first content reader, of the first access processing, updating, as a function of the modified first access processing, at least the first access processing associated with the first content in the first container of the first autonomous content stored on the first content storage memory.

2. The storage method as claimed in claim 1, wherein the storage method further comprises writing, in the first content storage memory, the first autonomous content.

3. The storage method as claimed in claim 1, wherein the storage method further comprises, upon the generation of the first autonomous content, generating the first execution processing adapted to execute the first access processing of the first autonomous content on the hardware abstraction layer.

4. The storage method as claimed in claim 3, wherein the storage method further comprises, generating a second autonomous content and upon generation of the second autonomous content, searching for the first execution processing adapted to execute the first access processing of the second autonomous content on the hardware abstraction layer of the first content reader.

5. The storage method as claimed in claim 4, wherein the storage method further comprises:
   in response to the searching locating the first execution processing adapted to execute the first access processing of the second autonomous content on the hardware abstraction layer having already been stored in the virtualization layer, creating an association between the second autonomous content and the first execution processing resulting from the search and storing the association in a second container with the second autonomous content within the first content storage memory; and in response to the searching not locating the first execution processing adapted to execute the first access processing of the second autonomous content on the hardware abstraction layer having already been stored in the virtualization layer, generating a second execution processing and storing the second execution processing in the virtualization layer in association with the second autonomous content, the second first execution processing being adapted to execute a second access processing of the second autonomous content using the hardware abstraction layer of the first content reader.

6. The storage method as claimed in claim 3, wherein, upon a copy, on the first content storage memory of the first content reader, of a further autonomous content stored in a second content storage memory of a second content reader, the storage method comprises:

storing the further autonomous content of the content to be copied in the first content storage memory, and modifying the virtualization layer of the first content reader associating further execution processing suited to execute a respective access processing of the further autonomous content of the further autonomous content copied on the hardware abstraction layer of the first content reader.

7. The storage method as claimed in claim 1, wherein the storing further comprises:

in response to receiving the request, checking whether at least one autonomous content is already stored in the first content storage memory; and in response to at least one autonomous content not already being stored in the first content storage memory, performing the generating of the first autonomous content and the generating of the first execution processing, and storing the first autonomous content in the first container within the first content storage memory and storing the first execution processing in the virtualization layer.

8. The storage method as claimed in claim 7, wherein the storing further comprises:

in response to at least one autonomous content already being stored in the first content storage memory, performing the generating of the first autonomous content and searching for the first execution processing adapted to execute the first access processing of the first autonomous content on the hardware abstraction layer of the first content reader.

9. A consultation method comprising:

consulting contents by a content reader, the content reader comprising a processor, a content storage memory, a virtualization layer and a hardware abstraction layer, wherein the consulting comprises the following acts performed by the content reader:

upon a reception of a request to access a first content of a given format stored in the content storage memory of the first content reader, searching for the requested first content in the content storage memory, wherein a first access processing suited to the given format is associated with the requested first content, and wherein the first access processing the first content and a link to a respective first execution processing are stored in a first container of the content storage memory and constitute a first autonomous content; and in response to the searching, obtaining the first access processing and the link to the respective first execution processing, triggering execution of the first access processing by the respective first execution processing, the respective first execution processing being is stored in the virtualization layer among a plurality of different execution processings, each of the different execution processings being associated with at least one autonomous content stored in the first content storage memory, the respective first execution processing being adapted to execute the first access processing of the first autonomous content using the hardware abstraction layer of the first content reader.

10. A non-transitory computer-readable medium comprising a program stored thereon, comprising program code instructions for executing a storage method when the program is run by a processor of a first content reader, wherein the storage method comprises:

storing content by the first content reader, the first content reader comprising a first content storage memory, a virtualization layer and a hardware abstraction layer, wherein the storing comprises:

receiving a request for storing a first content of a given format;

in response to the request, generating a first autonomous content, comprising creating a first container in which are stored at least the first content to be stored in the given format, and a first access processing suited to the given format and associated with the first content to be stored, and wherein data stored in the first container constitutes the first autonomous content;

generating a first execution processing, stored in the virtualization layer in association with the first autonomous content, the first execution processing being adapted to execute the first access processing of the first autonomous content using the hardware abstraction layer of the first content reader; and in response to a modification, on the first content reader, of the first access processing, updating, as a function of the modified first access processing, at least the first access processing associated with the first content in the first container of the first autonomous content stored on the first content storage memory.

11. A content reader comprising:

a first content storage memory, a virtualization layer, a hardware abstraction layer, and a processor, which is configured to perform acts comprising:

storing content by the content reader, which comprises:

receiving a request for storing a first content of a given format;

in response to the request, generating a first autonomous content, comprising creating a first container in which are stored at least the first content to be stored in the given format, and a first access processing suited to the given format and associated with the first content to be stored, and wherein data stored in the first container constitutes the first autonomous content;

generating a first execution processing, stored in the virtualization layer in association with the first autonomous content, the first execution processing being adapted to execute the first access processing of the first autonomous content using the hardware abstraction layer of the first content reader; and in response to a modification, on the first content reader, of the first access processing, updating, as a function of the modified first access processing, at least the first access processing associated with the first content in the first container of the first autonomous content stored on the first content storage memory.

12. The content reader as claimed in claim 11, wherein the processor is further configured to implement acts comprising:

upon a reception of a request to access the first content of the given format stored in the first content storage memory of the content reader, executing the first access processing suited to the given format associated with the stored first content.

13. A content reader comprising:
a first content storage memory,
a virtualization layer,
a hardware abstraction layer, and
a processor which is configured to perform acts comprising:
consulting contents by the content reader, which comprises:
upon a reception of a request to access a first content of a given format stored in the first content storage memory of the content reader, searching for the requested first content in the first content storage memory, wherein a first access processing suited to the given format is associated with the requested first content, and wherein the first access processing, the first content and a link to a respective first execution processing are stored in a first container of the first content storage memory and constitute a first autonomous content; and in response to the searching, obtaining the first access processing and the link to the respective first execution processing, triggering execution of the first access processing by the respective first execution processing, the respective first execution processing being stored in the virtualization layer among a plurality of different execution processings, each of the different execution processings being associated with at least one autonomous content stored in the first content storage memory, the respective first execution processing being adapted to execute the first access processing of the first autonomous content using the hardware abstraction layer of the content reader.

14. The content reader as claimed in claim 11, wherein the first content storage memory is a memory external to the content reader connected to said content reader upon implementation of the act of storing.

* * * * *